United States Patent [19]

Martin

[11] 4,002,852
[45] Jan. 11, 1977

[54] ELECTRONIC TELEPHONE NETWORK

[75] Inventor: Kenneth Watt Martin, Corinth, Miss.

[73] Assignee: International Telephone and Telegraph Corporation, New York, N.Y.

[22] Filed: July 8, 1975

[21] Appl. No.: 594,026

[52] U.S. Cl. .............................. 179/81 B; 179/16 F; 179/1 A
[51] Int. Cl.$^2$ ..................... H04M 1/00; H04M 1/60
[58] Field of Search ............... 179/16 F, 81 B, 1 A, 179/1 HF

[56] References Cited

UNITED STATES PATENTS

| | | | |
|---|---|---|---|
| 3,691,311 | 9/1972 | Wilson | 179/1 A |
| 3,745,262 | 7/1973 | Brolin et al. | 179/81 B |
| 3,751,602 | 8/1973 | Breeden | 179/81 B |
| 3,889,059 | 6/1975 | Thompson et al. | 179/81 B |
| 3,899,643 | 8/1975 | Tabalba | 179/81 B |
| 3,902,023 | 8/1975 | Lindgren | 179/81 B |

Primary Examiner—Thomas A. Robinson
Attorney, Agent, or Firm—James B. Raden; William J. Michals

[57] ABSTRACT

An electronic telephone network suitable for use with a two-wire telephone line includes a low-output dynamic microphone coupled to a preamplifier. The output signal of the preamplifier is coupled through a first equalization network which is responsive to an equalization signal which is related to the DC line current to equalize the frequency and amplitude spectrum of the transmitted signal irrespective of the telephone line length or loss. The output of the equalization network is applied to a line-driver amplifier, and as a first input to an electronic signal separator or hybrid. The output of the line-driver is coupled to the two-wire line, and as a second input through the separator by way of an attenuator. The output of the separator is coupled to a receive amplifier by way of a second equalization network which is also responsive to the equalization signal to equalize the frequency spectrum of the receive signal as a function of line length. The loss of the attenuator is selected to be equal to the gain of the line-driver thereby to isolate the transmitted signal and to pass the receive signal to the receive amplifier. In a preferred embodiment, the equalization signal is the DC supply voltage derived from the telephone line itself. The output impedance of the line-driver is lowered during transmit to reduce the sensitivity of the separator isolation and, therefore, the sensitivity of the sidetone signal. The various circuits of the network utilize active loads and other circuitry to provide maximum transmit signal dynamic range even at low line terminal voltages.

17 Claims, 5 Drawing Figures

ELECTRONIC TELEPHONE NETWORK

BACKGROUND OF THE INVENTION

This invention relates to electronic telephone networks and, more particularly, to a network which adapts itself to a wide range of telephone line lengths, losses, and operating conditions.

Conventional telephone networks include a carbon microphone, a transformer hybrid, a dynamic receiver, and various components such as resistors, capacitors, etc., which are used to interface a standard two-wire telephone line with the telephone handset. Due to the passive nature of the primary components (e.g., the carbon microphone) the standard telephone networks have several disadvantages such as large physical size, lack of fidelity, compatibility with other electronic telephone devices, and versatility. Electronic telephone networks are also known in the art and obviate many of the above enumerated disadvantages while providing transmit and receive gain and power output sufficient to enable the use of low-efficiency dynamic transducers in the handsets. However, these electronic telephone networks have several known disadvantages in that they are expensive, fragile and, more importantly, incompatible with many existing telephone facilities or practices. For example, the incompatibility problem arises due to the relatively high DC voltage requirement of the electronic networks as they derive their power from the telephone line. Disadvantageously, this prevents or severely limits parallel operation with conventional telephone networks. Furthermore, the high DC resistance of these prior art networks limits the maximum telephone line loop lengths on exchanges with conventional supervision equipment which require certain minimum current drain levels for satisfactory operation.

These and other disadvantages are overcome by the present invention wherein an electronic telephone network is provided which provides the normal functions of an electronic telephone network but which further provides: an electronic hybrid to separate the receive signal from the transmit signal while eliminating objectionable sidetone; correct DC line current drain levels for telephone central office supervision equipment; relatively constant receive and transmit levels over the entire range of conventional telephone line distances between the network and the exchanges; efficient use of available DC power; independence of the AC impedance characteristics of the telephone line; and, more particularly, while providing operation for DC terminal voltage between the normal maximum of 8.0 volts down to, and including, 2.2 volts.

SUMMARY OF THE INVENTION

Briefly, an electronic network for receiving and transmitting telephone signals over the two-wire line is provided. The network includes a first amplifier and means for applying the transmit portion of the telephone signals to the first amplifier. First means are provided which are responsive to the first amplifier for applying the amplified signal output of the amplifier to the line. Second means are provided which are responsive to the first amplifier and the output of the first means for separating the received portion of the telephone signals from the composite telephone signals at an output thereof. The network includes a second amplifier coupled to the output of the second means for increasing the level of the separated received signals; and, third means for deriving operating potential for the network from the telephone lines are also provided. Fourth means couple the first amplifier to the first means and are responsive to the operating potential for altering the frequency/amplitude characteristics of the amplified signal output of the first amplifier in acordance with the level of the operating potential. The preferred cicuitry embodiments include means for providing low line terminal voltage operation; and, control of the output impedance of an associated line-driver amplifier to reduce the electronic hybrid sensitivity and, therefore, the sensitivity of the sidetone signal to the line impedance characteristics.

BRIEF DESCRIPTION OF THE DRAWING

The advantages of this invention will become more readily appreciated as the same becomes better understood by reference to the following detailed description when taken in conjunction with the accompanying drawing wherein.

DETAILED DESCRIPTION

Figure 1:
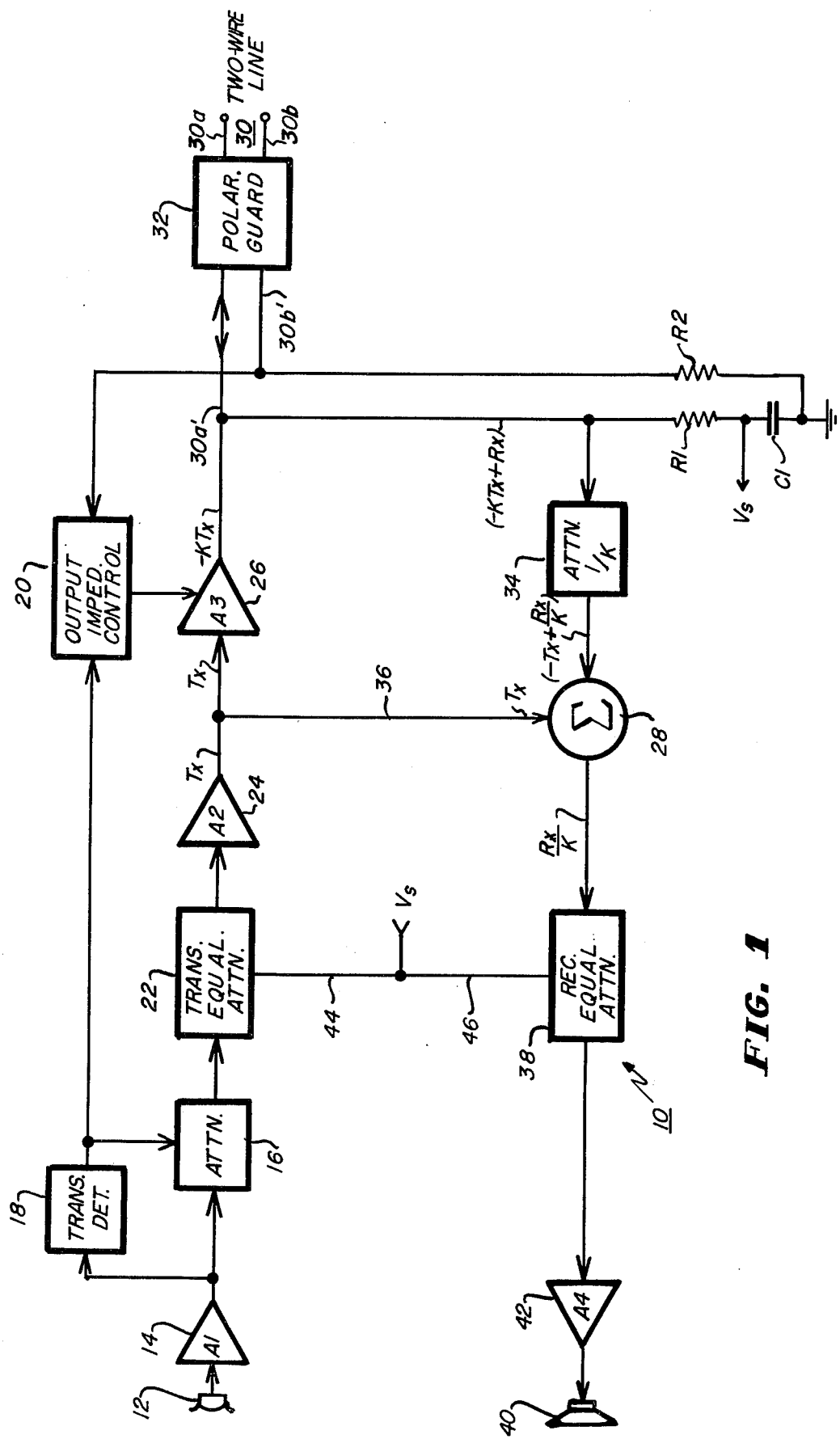
FIG. 1 is a combined schematic and functional diagram of an electronic telephone network in accordance with the principles of the present invention; and, FIGS. 2–6 depict preferred circuitry for use in the various blocks of the functional diagram of FIG. 1.

Referring now to FIG. 1 there is shown a block diagram of the electronic network 10 in accordance with the present invention. Network 10 includes a low-output dynamic microphone 12 or any other suitable telephone signal input such as a data input. The output of microphone 12 is coupled to a fixed-gain amplifier 14 the output of which is coupled to a fixed attenuator 16 and to transmit detector 18. The ouput of detector 18 is coupled as a second input to attenuator 16 and as a first input to output impedance control 20. The output of attenuator 16 is coupled as a first input to transmit signal equalizer 22 which may take the form of a variable attenuator as described more fully hereinafter. The output of equalizer 22 is coupled to another fixed-gain amplifier 24 the output of which is coupled to line-driver 26 and as a first input to summing junction 28. The output of line-driver 26 is coupled to a two-wire telephone line 30 wherein its conductors are depicted as 30a and 30b, by way of a polarity guard 32. The network side of guard 32 is connected to the network by way of line conductors 30a' and 30b'.

Conductor 30a' is coupled as a second input to summing junction 28 by way of a fixed attenuator 34. Conductor 30a' is also coupled to ground by way of a filering network comprising resistor R1 and filtering capacitor C1. The junction of resistor R1 and C1 provides a source of operating potential ($V_s$) for the electronic network. The other side of the telephone line is connected to ground at conductor 30b' by way of a sensing resistor R2.

Conductor 30b' is also coupled as a second input to output impedance control 20. The output of impedance conrol 20 is coupled to line-driver 26. The input of line-driver 26 is also coupled, by way of lead 36, as a second input to summing junction 28. The output of summing junction 28 is coupled as a first input to a variable attenuator 38. The output of attenuator 38 is also coupled to an output transducer 40 by way of a fixed-gain receive amplifier 42. Finally, operating potential $V_s$ is also coupled as a second input to attenuators 22 and 38 by way of leads 44 and 46, respectively.

The function of electronic telephone network 10 of FIG. 1 is described as follows. As will be described more fully hereinafter with reference to detailed circuitry FIGS. 2-6, a primary function of network 10 is to utilize the DC power available at the network end of the telephone line in a controlled manner to satisfy the reqirements of: (i) ensure minimum DC current drain for a given loop resistance to ensure proper operation of the central office supervisory equipment; (ii) provide DC bias, or operating potential, to the line-driver amplifier and the receive amplifier to ensure satisfactory dynamic range under all specified operating conditions; and (iii) to provide a DC voltage signal which accurately reflects the DC line current such that the DC signal can be used for loss equalization over a given range of telephone line losses. Since line-driver amplifier 26 sinks a majority of the telephone line current, its dominating influence is advantageously utilized to provide a stable and repeatable current drain which can be adjusted to set the network current drain level to a given specification.

The DC supply voltage or operating potential $V_s$ of network 10 is preferably provided by a simple RC filter comprising resistor R1 and capacitor C1. In one constructed embodiment resistor R1 was selected as 360 ohms and capacitor C1 as 220 MFD. For a typical telephone line, potential $V_s$ varies from a minimum 0.8 to 2.2 volts depending on the telephone line loop resistance. Since this derived potential $V_s$ is an accurate indicator of total loop resistance, and therefore DC line current, it is used, in accordance with a feature of the present invention, to conrol the gain of attenuators 22 and 38 for cable loss equalization. Further, the various gain stages of FIG. 1 are designed to operate with stable closed-loop gains over this available range of operating potential $V_s$. As will be described more fully hereinafter with reference to the remaining drawing figures, the value of resistor R1 was selected to optimize the dynamic range of the transmitted and received signals even at very low terminal voltages. Further, the various stages that do not contribute directly to receive or transmit power outputs are designed to utilize minimum DC current flow, thus this design contributes to low DC voltage operation in accordance with the priinciples of the present invention.

Referring now more specifically to the various stages of the network 10 depicted in FIG. 1, it can be seen that the transmit signal flow from the dynamic transducer or microphone 12 is by way of amplifier 14, attenuators 16 and 22, and amplifiers 24 and 26. The overall transmit frequency response is determined primarily by microphone 12, amplifier 14, and transmit equalization attenuator 22. Amplifier 14 is selected to have a fixed gain and in one constructed embodiment it provided 24 db gain at one KHz. Attenuator 16 is under the control of transit detector 18 to provide either 0 or 10 db of loss. That is, when a transmit signal which is greater than a given threshold level is provided by microphone 12, transmit detector 18 senses this transmit level and switches attenuator 16 to provide zero loss. Transmit detector 18 is preferably an AC level detector having a fast response and slow release, and funtions to reduce background noise during the receive operation of network 10 of FIG. 1. Transmit detector 18 also functions to control the output of impedance control 20.

Attenuator 22 provides variable attenuation and frequency response which varies as a function of the operating potential $V_s$. Thus, attenuator 22 provides transmit equalization, for amplitude and frequency, for a wide range of different cable losses. Attenuator 22 is also used to limit transmit gain when the DC terminal voltage, or operating potential $V_s$, is very low, thereby to prevent clipping at normal voice signal levels.

As previously alluded to, operating potential $V_s$ may vary from a maximum of 2.2 volts, which corresponds to an essentially zero loss telephone line, down to 0.8 volts which corresponds to a maximum loss line and the minimum operating voltage of network 10, as utilized in a preferred embodiment of the present invention. The attenuation provided by attenuator 22 is minimum when $V_s$ is in the range of 1.1 to 1.15 volts. This range corresponds to a typical total loop resistance of 2650 to 2200 ohms, respectively, in a typical 48 volt system. As $V_s$ increases from 1.15 to 2.2 volts—2.2 volts being the maximum voltage corresponding to essentially zero line loss—the average attenuation provided by attenuator 22 increases to its maximum. On the other hand, decreasing $V_s$ from 1.1 volts to the minimum operating voltage of the system which is 0.8 volts, also causes the attenuation provided by attenuator 22 to increase. This increase in attenuation over the low voltage range is provided in order to correspondingly decrease transmit gain at approximately the same rate as the transmit dynamic range decreases. Accordingly, this has the desirable effect of retaining a margin of dynamic range above normal talking levels, thereby to prevent distortion as would result from clipping. Accordingly, the electronic telephone network, in accordance with the present invention, operates with good quality, albeit with reduced gain, down to the very minimum DC terminal voltage of the network (approximately 2.2 volts) which also corresponds to the minimum 0.8 volts operating potential minimum. Thus, parallel operation with other networks including conventional networks is provided at longer telephone line lengths and at the corresponding low DC terminal voltages.

As just described, increasing the operating potential $V_s$ from 1.15 to 2.2 volts causes the average attenuation to increase to a maximum. The characteristics of attenuator 22 are selected such that the attenuation at the upper end of the frequency spectrum increased at a faster rate (as $V_s$ increases) than at the lower end of the spectrum or band. Stated differently, high frequency roll-off becomes more pronounced for larger values of $V_s$. This attenuation versus frequency characteristic is designed to provide near perfect transmit equalization in both amplitude and frequency response for No. 26 gauge cable from 0 to 21.5 K feet, as fed from a 48 volt, 400 ohm bridge feed.

Amplifier 24 functions as a fixed gain wide band circuit that increases the relatively low output signal from attenuator 22 sufficient to drive line-driver 26 and to provide a usable signal to the input of separator 28 at input lead 36. However, as previously discussed, since amplifier 24 does not directly contribute to the power output of network 10, it is provided as a low current drain current.

Line driver amplifier 26 in addition to establising and dominating the DC characteristics of the network, also provides the transmit signal power to drive the telephone line and establishes the AC output impedance of the network. Amplifier 26 is preferably a relatively wide band circuit having a very high open-loop gain.

This is done so that the various operating characteristics of amplifier 26 can be determined by passive, external feedback components, such as resistors, and the telephone line itself. The output impedance of amplifier 26 is determined by utilizing current feedback from the sensing resistor R2 and in conjunction wth a degree of voltage feedback. Resistor R2 typically has a very low value and in one constructed embodiment resistor R2 was 3 ohms.

The terminal impedance of network 10 (which impedance determines the return loss of the system) is determined by the output impedance $R_o$ of amplifier 26. As previously alluded to and as discussed in more detail hereinafer, the output impedance of amplifier 26 is determined by the voltage an current feedback around amplifier 26. Output impedance control 20 functions to switch a portion of the feedback network of amplifier 26 to adjust the output impedance $R_o$ to either one of two values. That is, amplifier 26 operates with one value of $R_o$ during transmit (typically 300 ohms) and at the other value during receive operation (typically 900 ohms). The transmit or receive state is determined by transmit detector 18. As discussed more fully hereinafter, the two level impedance technique is utilized to reduce the sensitivity of the sidetone signal to different line impedances. That is, return loss during the higher impedance receive state is near perfect during receive but poor during transmit. Accordingly, line length has very little effect on terminal impedance.

The electronic hybrid function, which separates the receive signal from the composite transmit and receive signal at the telephone line and routes the receive signal to the receive amplifier circuitry, is provided by amplifier 26, attenuator 34 and summing junction 28. The actual signal separation is provided at the summing junction 28. The signal provided at input lead 36 by the output of amplifier 24 is the transmit signal only due to the low output impedance of amplifier 24 and the isolation of the receive signal provided by amplifier 26. Amplifier 26 amplifies and inverts this transmit signal by a factor of K. The output of amplifier 26, $KT_x$ and the receive signal $R_x$ are attenuated by attenuator 34 by a factor of 1/K. Thus, attenuator 34 reduces the output of amplifier 26 to substantially the same amplitude as the output signal at the output of amplifier 24. Accordingly, these two signals cancel in the summing junction 28 and only an attenuated receive signal remains.

Thus, amplifier 26 and attenuator 34 are called upon to provide transmit signals at the input of summing junction 28 with equal amplitudes and opposite polarities for all line conditions over the frequencies of interest. Although this function cannot be performed perfectly, some residual transmit signal is nevertheless desirable so as to provide some sidetone. Actually, the ideal network would produce optimum sidetone level irrespective or regardless of line conditions. As discussed more fully hereinafter, electronic telephone network 10 in accordance with the teachings of the present invention, achieves a degree of independence from line conditions because of the unique design of attenuator 34 and amplifier 26. In one constructed embodiment, attenuator 34 was a resistive divider and RC phase shift network which was optimized to provide maximum cancellation over the audio frequency band for 1800 ohms of 26 gauge line. This is the worst case condition for sidetone reduction since attenuators 22 and 38 function to provide maximum gains in this range. Whereas, however, the reduction in gain provided by attenuators 22 and 38 at very long, or very short, line lengths tends to reduce the respective gains and to thereby simplify the compensation requirements.

Ideally, amplifer 26 should function as a perfect voltage source; that is, with zero output impedance. In this case, attenuator 34 could then be adjusted to exactly offset the constant voltage gain of amplifier 26 and perfect cancellation would therefore occur. However, it is known in the art that such ideal characteristics cannot be obtained as the output of amplifier 26 is across the telephone line and otherwise establishes the network impedance; that is, the received signal must necessarily appear, or be developed, across the output impedance of amplifier 26. However, since the terminal impedance for minimum return loss (i.e. impedance matching) is most critical when a signal is being received, this distinction in criticality is advantageously utilized, in accordance with the principles of the present invention, to reduce sensitivity of the sidetone signal to telephone line impedance variations. This is accomplished by virtue of the switching between two impedance levels in the design of amplifier 26. In currently preferred practice, the output impedance of amplifier 26 is approximately 900 ohms (which is the standard conventional or typical telephone line impedance) during receive and standby or idle periods. Accordingly, this receive impedance value permits receive signals to develop normal voltage levels across the network terminals and provides near optimum return loss.

If however, the network impedance, or $R_o$, were maintained at 900 ohms during transmit, the voltage gain of amplifier 26 would be a function of telephone line impedance and sidetone levels would vary greatly with different cable lengths. Therefore, in accordance with a feature of the present invention, the network impedance $R_o$ is switched to approximately 300 ohms during transmit which brings amplifier 23 significantly nearer to the ideal perfect voltage source. It should now be appreciated that an $R_o$ of 300 ohms reduces the effect of telephone line impedance variations on the voltage gain of amplifier 26, and sidetone levels remain substantially constant for different cable lengths. It has been found that this technique reduces sidetone variations relative to line impedance by approximately six *db*. This is particularly desirable during unfavorable impedance conditions such as parallel operation with conventional telephone networks. Further, sidetone changes between receive and transmit conditions has been found to be negligible because of the reduced transmit gain during receive operation as provided by attenuator 16. That is, the reduced gain approximately offsets the degraded cancellation at summing junction 28 due to the increase of $R_o$ from 300 to its 900 ohm level.

The output of summing junction 28 is the received signal plus the sidetone signal. Receive equalizaton attenuator 38, which is functionally and structurally similar to attenuator 22, equalizes the received signal in both amplitude and frequency for different cable lengths. In one constructed embodiment, attenuator 38 was selected to provide substantially identical operation to that of attenuator 22 between 0 and 1800 ohms of telephone line resistance. The loss of attenuator 38 is minimum when the resistance of the telephone line is approximately 1800 ohms; however, unlike attenuator 22 the loss of attenuator 38 remains at its minimum level as the telephone line resistance, or effective telephone line length, increases from 1800 ohms, i.e., reducing the DC terminal voltage.

Finally, amplifier 42 provides a fixed gain and amplifies the relatively low receive signal output from attenuator 38 to a level sufficient to drive output transducer 40. A relatively high gain is required in this stage to overcome the losses introduced by attenuator 34 prior to summing junction 28. As will be discussed more fully hereinafter with reference to the detailed circuitry figures, the DC characteristics of amplifier 42 provide a maximum voltage swing across output transducer 40 for any DC supply potential $V_s$.

Figure 2:
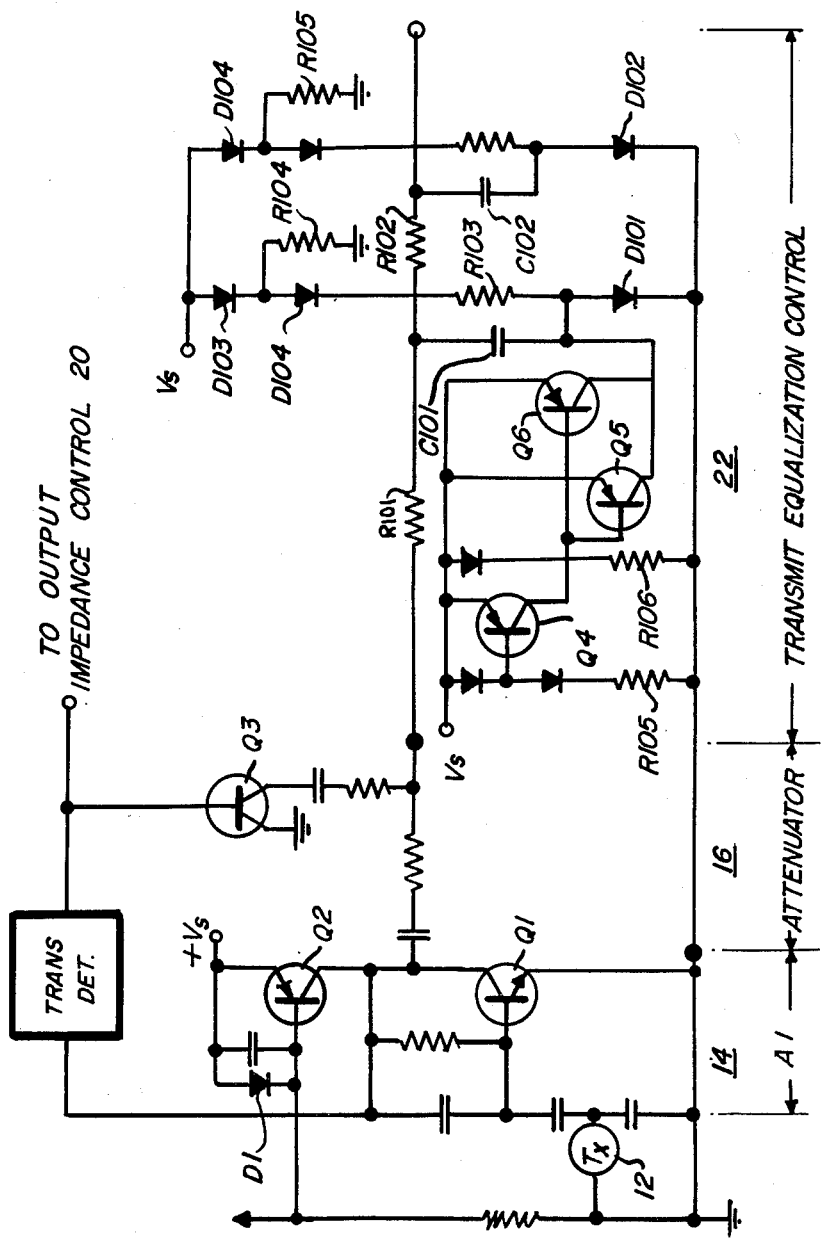

Referring now to FIG. 2, there are shown schematic circuit diagrams of amplifier 14, attenuator 16 and transmit equalization control 22 suitable for use in the electronic telephone network 10 of FIG. 1. Amplifier 14 comprises a conventional common emitter amplifier stage which in one constructed embodiment provided 24 db gain. However, the current supply to transistor Q1 of amplifier 14 is provided by a constant current load transistor Q2. That is, Q1 is an active constant current load which provides a substantial DC bias current to the collector of Q1 (which is necessary for low noise and sufficient gain at low values of $V_s$) without loading the AC signal. That is, transistor Q2 provides a large AC impedance while supplying a substantially high level of current to transistor Q1. Transistor Q2 is biased into operation as a constant current source by current mirror diode D1. This current mirror diode potential at the base electrode of transistor Q2 is also made available as a current mirror diode signal to the active load or constant current source transistor of other circuits of electronic telephone network 10.

The input signal provided by transducer 12 is also coupled to transmit detector 18 by way of amplifier 14. Detector 18 provides a logic 1 at its output for receive or normal conditions; and a logic 0 for the transmit mode. Detector 18 may take any one of a number of suitable circuit configurations but preferably functions as a fast attack/slow decay switching device thereby to provide substantially undetectable control of transmit gain and output impedance. The output of detector 18 is coupled to output impedance control 20 and to the input or base electrode of transistor Q3 of attenuator 16. It can be seen that when detector 18 provides its logic 1 output transistor Q3 is biased into conduction thereby shunting a portion of the output signal from amplifier 14 to ground through the main electrode of transistor Q3.

Transmit equalization attenuator 22 comprises a two-pole filter/attenuator that utilizes the dynamic resistance of diodes as gain control elements. The transmit audio signal flow is through resistor R101 and resistor R102. Attenuation frequency response shaping is provided by capacitor C101 in combination with diode D101, and capacitor C102 in combination with diode D102, which function to shunt the transmit signal to ground. Diodes D101 and D1012 function to provide variable resistance elements.

The dynamic or small-signal resistance of diode D101 is determined by the DC current flowing from $V_s$ through diodes D103 and D104, resistor R103 and diode D101 itself. When $V_s$ is near its maximum value, the resistance of diode D101 is relatively low and the signal loss through capacitor C101 and diode D101 is relatively large. However, as $V_s$ decreases toward its minimum value, the resistance of diode D101 increases substantially and signal attenuation accordingly decreases. When $V_s$ is approximately 1.15 volts, diodes D104 and D101 are at or near cut-off and, therefore, there is substantially no signal loss. Thus, overall transmit gain when diodes D104 and D101 are cut-off is maximum.

Capacitor C102 and diode D102 function in a similar manner. However, due to the relatively small size of capacitor C102 this circuit functions to place a "zero" much higher in the audio spectrum than the circuit of capacitor C101 and diode D101. Accordingly, the circuit associated with capacitor C102 and diode D102 functions of provide a majority of the frequency compensation of transmit equalization control 22 in accordance with a feature of the present invention. Stated somewhat differently, high-frequency roll-off becomes more pronounced as $V_s$ increases.

Resistors R104 and R105 of transmit equalization control 22 function to increase the voltage drop of diodes D103 and D104 respectively. This functions to shape the overall characteristics of transmit equalization 22 so as to equalize or accept No. 26 gauge cable. The remaining components associated with transmit equalization control 22 of FIG. 2 function to reduce transmit gain as $V_s$ drops approximately 1.1 volts to the minimum operating potential of 0.8 volts. The current flowing through resistor R105 is larger than the maximum current flowing through resistor R106 throughout a majority of the range of operating potentials $V_s$. Accordingly, current meter transistor Q4 remains saturated as it cannot source all of the current that is programmed for it by diode D105. Accordingly, this functions to keep transistors Q5 and Q6 cut-off and essentially out of the circuit of transmit equalization control 22.

However, as $V_s$ drops to approximately 1.1 volts —noting that transmit gain is maximum at a $V_s$ of approximately 1.15 volts—the current flowing through diode D105, D106 and R105 is reduced to a value equal to the maximum current flowing through diode D107 and resistor R106 due to the impending cut-off of diodes D105 and D106. A further reduction of $V_s$ results in current flow through diode D107 and the mirrored current flow from transistors Q5 and Q6 because transistor Q4 can no longer supply the maximum need current flow through resistor R106. Accordingly, the current from transistors Q5 and Q6 flows into diode D101 and increases attenuation of the transmit signal. As previously discussed, this attenuation begins at approximately 1.1 volts and increases as the operating potential of $V_s$ decreases to the minimum value of 0.8 volts. It should now be appreciated that transmit equalization control 22 is preferably designed empirically with respect to its attenuation and frequency response characteristics to match a given gauge of cable (such as No. 26 gauge cable) for equalization purposes.

Figure 3:
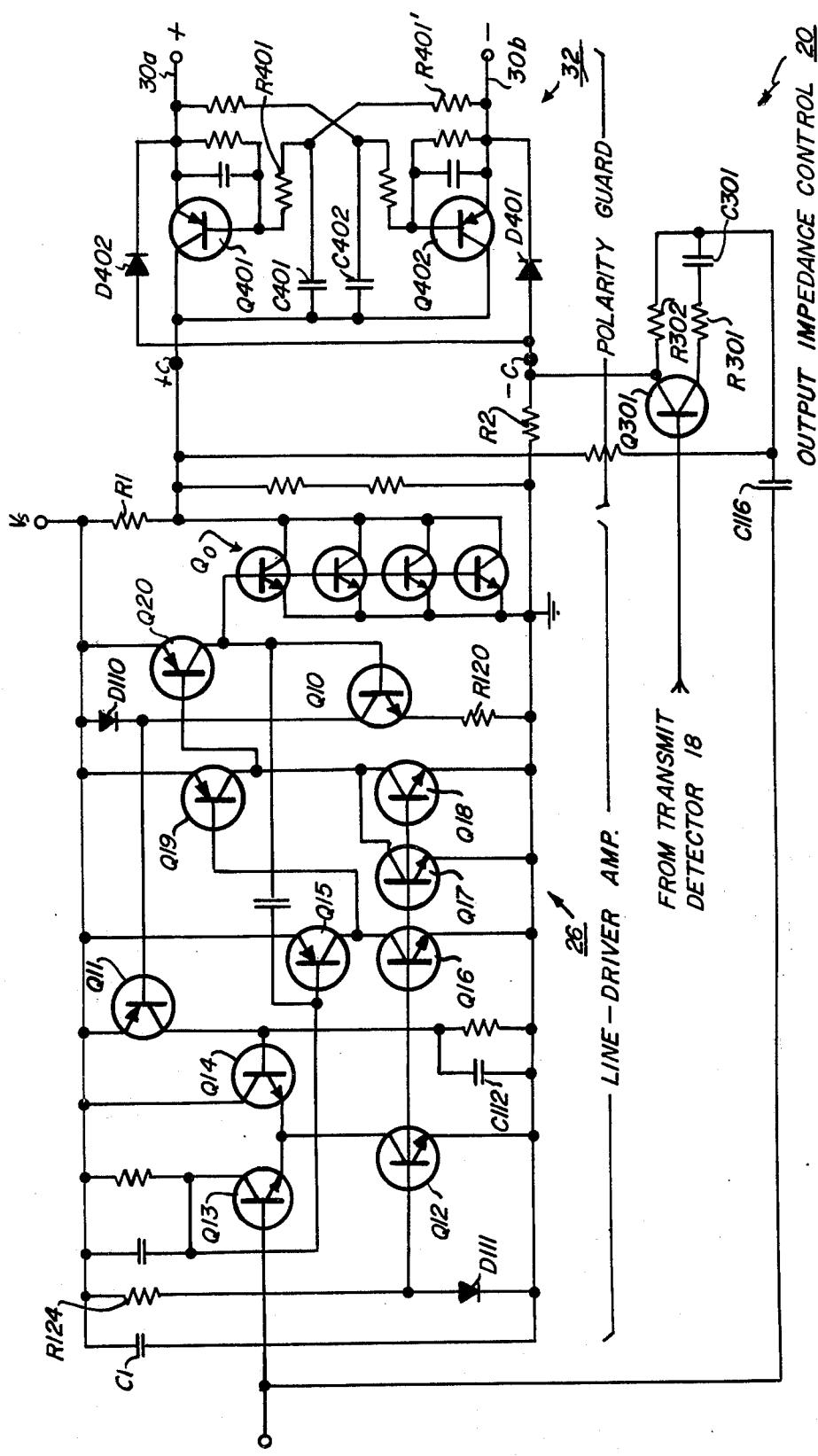

Referring now to FIG. 3, there are shown schematic diagrams of line-driver amplifier 26, output impedance control 20 and polarity guard 22. The operation of line-driver amplifier 26 will be described in conjunction with FIGS. 4 and 5 which respectively provide simplified diagrams of the DC and AC equivalent circuits of amplifier 26.

Figure 4:
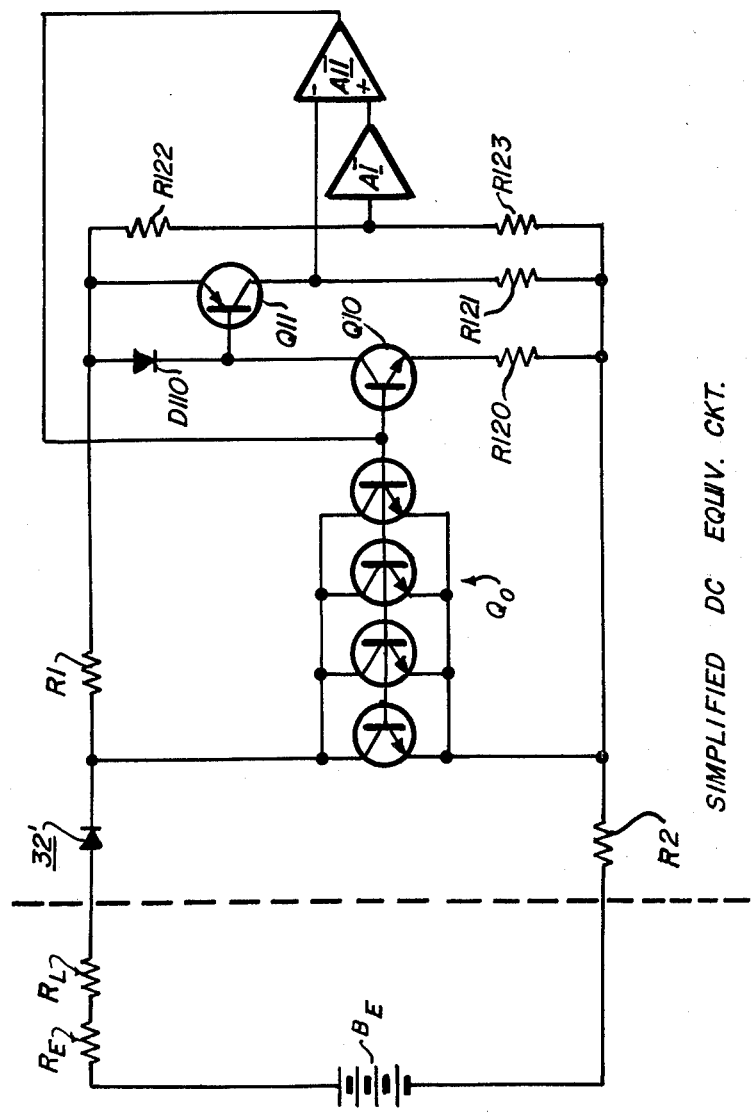

As previously alluded to, the achievement of maximum transmit dynamic range for operation at long telephone line lengths or parallel operation, particularly when the DC terminal voltage is low, requires that the collector-emitter path of the output transistor be coupled directly across the line and capable of saturation operation. That is, any serially coupled element for DC line current stabilization, such as an emitter resistor, for example, reduces the transmit signal output voltage swing. In FIGS. 3 and 4, the paralleled output transistors $Q_o$ are shown as being directly coupled across the telephone line except for the voltage drop induced by polarity guard 32 which is represented by a diode 32' in FIG. 4 and the drop of sensing resistor R2. The telephone line in FIG. 4 is schematically represented by the exchange battery $B_3$, the terminal impedance of the central exchange $R_e$ and the telephone line resistance $R_1$. As will be described in detail hereinafter, a unique polarity guard is utilized, in accordance with the principals of the present invention, to minimize both DC and signal losses. Sensing resistor R2 is used for AC feedback and typically has a very small value and therefore only a negligible effect on the DC characteristics of the overall electronic telephone network. In one constructed embodiment, sensing resistor R2 had a value of 3 ohms.

Output transistors $Q_o$ sink a majority of the DC line current. Accordingly, it is necessary to accurately control this current for overall control of the electronic network's DC characteristics. The paralleled base electrode connections of transistors necessary for accurately establishing collector current as the base-emitter junction voltage is an accurate indicator of collector current flow. In the present invention, this base-emitter voltage is monitored and used in a feedback system to determine the base drive current necessary to establish the required collector current. It will be appreciated by those skilled in the art that accurately matching output transistors, such as that resulting from integrated circuit fabrication, are preferable for this design.

Assuming initially that resistor R120 of FIGS. 3 and 4 is shorted or 0 ohms, the operation of amplifier 26 is described as follows. Transistor Q10 and output transistors $Q_o$ would therefore have the same base-emitter voltages and since transistors Q10 and $Q_o$ are matched, the collector current in each transistor would be equal. Accordingly, the collector current of transistor Q10 would accurately reflect the DC line current flowing through output transistors $Q_o$. In actual operation, resistor R120 has a finite value and in one constructed embodiment it had a value of approximately 2400 ohms. Nevertheless, the accurate current sensing function of transistor Q10 is maintained and the otherwise wasted current of transistor Q10 is substantially reduced. The collector current of transistor Q10, which is an accurate function of the collector currents of output transistors $Q_o$, flows through diode D110 which, in turn, controls current mirror transistor Q11. Thus, the collector current of Q11 is also approximately equal to the collector current of Q10. The collector current of transistor Q11 is converted to a voltage signal by resistor R121. Accordingly, the voltage developed across resistor R121 is also an accurate indication of the collector current flowing through output transistors $Q_o$.

The collector of transistor Q11 is coupled as a first input ("−") to an operational amplifier AII. Resistors R122 and R123 form a voltage divider and the junction of resistors 122 and 123 is coupled to the other input ("+") of amplifier AII by way of a buffer amplifier AI. Amplifier AII functions to force the voltage across resistor R121 to be equal to the voltage provided by the voltage divider by adjusting the base drive current to output transistors $Q_o$. Now, since the voltage across resistor R121 is accurately dependent on DC line current, and the voltage provided by the voltage divider resistors R122 and R123 is accurately dependent on DC line voltage, amplifier AII establishes an equilibrium condition controlled by the total loop resistance that fixes the DC characteristics of the electronic telephone network. The voltage divider comprising resistors R122 and R123 and operational amplifier AI are actually an integral part of fixed gain amplifier 24 of FIG. 1. However, since they function to control the DC characteristics of amplifier 26 they are depicted in FIG. 4.

In FIG. 3, amplifier AII of FIG. 4 is comprised of transistors Q13 through Q20. Transistors Q13 and Q14 provide a balanced differential input; and transistors Q12 and Q16-18 are current mirrors which operate under the control of resistor R124 and diode D111. It can be seen that due to the active or constant-current loads, all gain producing transistors of amplifier 26 of FIG. 3 are biased in their linear operation region even when the source of operating potential $V_s$, is as low as 0.8 volts.

Figure 5:
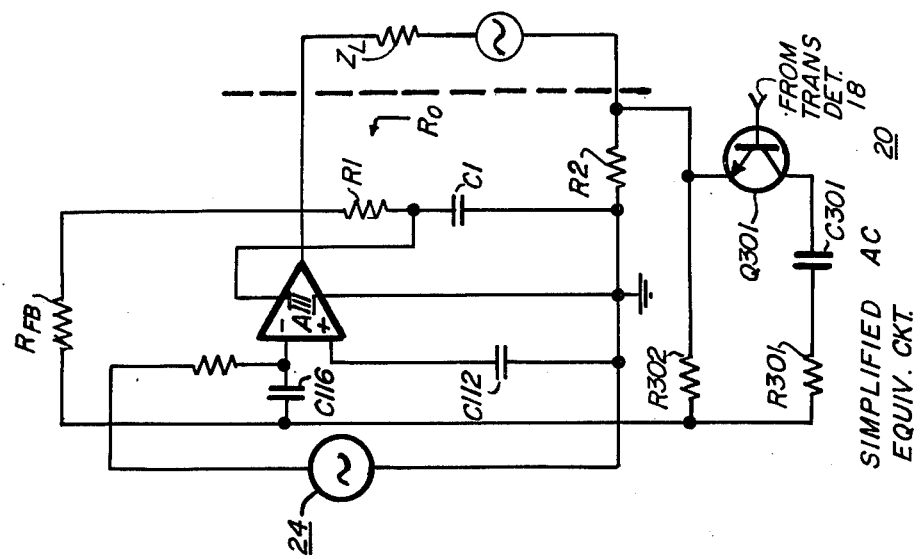

Referring now to FIG. 5, there is shown a simplified AC equivalent circuit diagram of amplifier 26 of FIG. 3. Since the AC characteristics of amplifier 26 are affected by output impedance control 20, circuit 20 is also illustrated in FIG. 5. Control 20 includes a switching transistor Q301 which is serially coupled with capacitor C301 and resistor R301 which components are coupled across resistor R302. Accordingly, transistor Q301 responds to the output of transmit detector 18 to vary the resistance of resistor R302 which is disposed in the feedback loop of amplifier 26. That is, the normal or receive state of transmit detector 18 is a logic 1 which keeps transistor 301 turned on. This parallels resistor R301 with resistor R302 and results in the network impedance $R_o$ being relatively high. During transmit, the output of detector 18 goes to its logic 0, or "low" state which turns off transistor Q301. This essentially removes resistor R301 from the circuit which results in $R_o$ going to its lower impedance value. In one constructed embodiment the component values of amplifier 26 were selected such that the normal or receive impedance, $R_o$, was 900 ohms whereas the transmit state impedance $R_o$ was approximately 300 ohms.

In FIG. 3, amplifier AIII of FIG. 5 comprises the differential input transistors Q13 and Q14 of FIG. 3, which drive the directly coupled common emitter amplifiers Q15, Q19 and Q20. Q20 drives the parallel base connection of output transistors $Q_o$, i.e., the line-driver. Q20 is biased to supply enough drive signal to saturate output transistors $Q_o$ even when the DC terminal voltage is near its minimum. Transistors Q16-18 are active loads for transistors Q15 and Q19 and contribute to the very high open loop gain of amplifier 26. Transistor Q12 provides a current source bias for the emitters of the differential input pair, Q13 and Q14. Capacitor C112 references the non-inverted input of amplifier AIII to ground and, more importantly, it removes all AC feedback from the DC feedback path provided by transistor Q11 as discussed with reference to the DC equivalent circuit of FIG. 4. As previously allued to, sensing resistor R2 provides a sampling point for the AC feedback of amplifier 26 as illustrated in FIG. 5.

Referring again to FIG. 3, the operation of polarity guard 32 will be briefly described. Assuming that conductor 30a is the positive potential side of the line, this condition forward biases transistor Q401 and diode D401. Transistor Q401 would then receive its base drive current through resistors R401 and R401' which complete the circuit to the negative potential conductor 30b. Thus, the transistor Q41 can fully saturate such that its $V_{ce}$ is on the order of 0.15 volts. Thus, the total voltage drop across the polarity guard is 0.8 volts which represents the 0.15 volt $V_{ce}$ + 0.65 volts (or one $V_d$ drop). Similarly, when conductor 30b is the positive potential side of the telephone line, transistor Q402 and diode D402 are forward biased. Thus, polarity guard 32 supplies operating potential of the correct polarity to the electronic telephone network of the present invention irregardless of the polarity of the telephone line. This is important as a practical consideration as in many telephone systems the respective polarities of the various lines are not consistent with one another. Finally, capacitors C401 and C402 function to maintain the DC drive to the transistors Q401 and Q402 during large transmit signal excursions.

Figure 6:
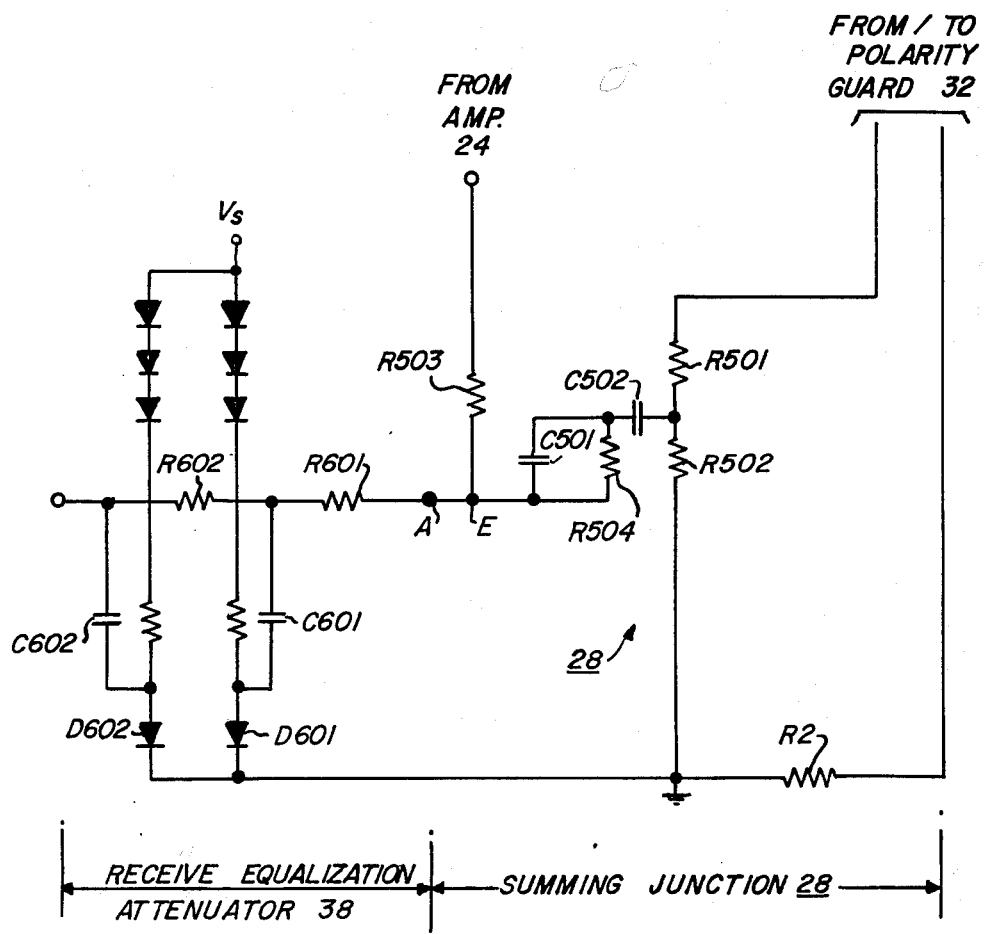

Referring now to FIG. 6, there is shown a schematic diagram of summing junction 28 and receive attenuation control 38 in accordance with the principles of the present invention. It can be seen that resistors R501 and R502 are disposed across the telephone line in a voltage divider network configuration. The voltage thusly provided functions to reduce both transmit and receive voltage signals. The ratio of this voltage divider in conjunction with the ratio of resistor R503 and the shaping network, comprising R504, C501 and C502, is selected such that the transmit voltage from amplifier 24 of FIG. 1 offsets or nulls the inverted amplified transmit voltage provided by line-driver 26 at point E. As previously discussed, the received voltage is attenuated but it is not nulled by summing junction 28.

The division ratio of resistors R501 and R502 and the impedance of the shaping network comprising capacitors C501, C502 and resistor R504 were empirically designed to provide optimum null across the audio spectrum for 21.5 K feet of No. 26 gauge cable. It has also been found that this selection provides good performance not only with 21.5 K feet of No. 26 gauge cable, but also for all practical operation conditions. Accordingly, summing junction 28, in conjunction with the equalization and output impedance control, in accordance with the present invention, provides optimum sidetone control for all practical operating conditions—including parallel operation with conventional telephone networks.

Referring now to the receive equalization attenuator 38 of FIG. 6, it can be seen that attenuator 38 is also a two-pole filter attenuator similar in function and structure to attenuator 22 of FIGS. 1 and 2. Accordingly, the operation of attenuator 38 need not be described in great detail herein. However, it can be seen that both receive and sidetone signals flow through resistors R601 and R602. Further, capacitor C601 in combination with diode D601, and capacitor C602 in combination with diode D602 provide the control of attenuation and frequency response characteristics, in response to the value of the derived operating potential $V_s$.

It should be noted however, with reference to attenuator 38 of FIG. 6, that the dynamic resistance of a diode is most useful as a variable resistance when the applied AC signal level is kept at a relatively low value so as to prevent excessive distortion. As a practical matter, prevention of load distortion necessitates that the AC signal not exceed approximately 10 or 12 millivolts. For this reason, relatively small signal levels are applied to and derived from summing junction 28 and relatively large gains are provided by the receive amplifier 42 of FIG. 1, in accordance with another feature of the present invention.

What has been taught, then, is an electronic telephone network facilitating, notably, automatic telephone line equalization, substantially reduced sensitivity of the associated sidetone signal, and operation at very low terminal voltage levels including parallel operation at low voltage operations. The form of the invention illustrated and described herein is but a preferred embodiment of these teachings, in the form currently preferred for manufacture. It is shown as an illustration of the inventive concepts, however, rather than by way of limitation, and it is pointed out that various modifications, and alterations may be indulged in within the scope of the appended claims.

Having thus described my invention, what I claim as new and desire to protect by United States Letters Patent is:

1. An electronic telephone network for receiving and transmitting signals over a two-wire telephone line the impedance of which may vary over a given range, said network comprising in combination:
 a preamplifier,
 means for applying telephone input signals to said preamplifier;
 a line-driver amplifier having an input coupled to said preamplifier and an output coupled to said line and being responsive to said preamplifier for amplifying the output signals of said preamplifier and wherein the gain of said line-driver amplifier varies in accordance with its output impedance relative to the impedance of said line;
 means coupled across said line-driver amplifier for substantially separating received signals from said telephone line and for providing the separated signals at an output thereof, said separating means including an attenuator wherein an attenuated portion of the signals at said output of said line-driver amplifier is combined with a portion of the signals at its input to provide said separated signals;
 a receive amplifier coupled to said output of said separating means for increasing the level of said separated signals;
 means for deriving operating potential for said network from said line;
 means coupled between said preamplifier and said line-driver amplifier and responsive to said telephone input signals for providing a control signal when the level of said telephone input signals exceeds a predetermined value; and,
 means coupled to said line-driver amplifier and responsive to said control signal for decreasing the AC output impedance of said line-driver amplifier from a first given level to a second given level when the level of said telephone input signals exceeds said predetermined value, thereby to reduce the gain variations of said line-driver amplifier with respect to variations in the impedance of said line over said given range.

2. An electronic telephone network for receiving and transmitting telephone signals over a two-wire line said network comprising in combination:
 a first amplifier;

means for applying the transmit portion of said telephone signals to said first amplifier;

means for providing a control signal when the transmit portion of said telephone signals exceeds a predetermined level;

first means responsive to said first amplifier and said control signal for applying the output signal of said first amplifier to said line, said first means comprising a line-driver amplifier having at least one output transistor having first and second main electrodes coupled across said line and a control electrode, said line-driver amplifier including means for controlling the value of the DC current flowing through said main electrodes and said line to a predetermined value, and said line-driver amplifier including means responsive to said control signal for decreasing the AC output impedance of said line-driver amplifier when the transmit portion of said telephone signals exceeds said predetermined level;

second means responsive to said first amplifier and the output of said first means for separating the received telephone signals from the composite telephone signals and for providing the separated signals at an output thereof, said separating means including an attenuator coupled across said line-driver amplifier wherein the output of said first amplifier is combined with an attenuated version of the output of said line-driver amplifier to provide said separated signals;

a second amplifier coupled to said output of said second means for increasing the level of said separated signals;

third means cooperating with said line-driver amplifier for deriving operating potential for said network from said line; and, fourth means coupled between said first amplifier and said first means and responsive to a signal related to said operating potential for altering the amplitude characteristics of said output signal of said first amplifier in accordance with the loss characteristics of said line.

3. The telephone network according to claim 2, including a switchable attenuator coupled between said first amplifier and said line-driver amplifier and responsive to said control signal for attenuating the output signal from said first amplifier when the transmit portion of said input telephone signals are less than said predetermined level.

4. The telephone network according to claim 3, wherein said first and second amplifiers are operatively coupled to said operating potential through constant current loads.

5. An amplifier adapted for coupling telephone signals to a telephone line and for controlling the DC current flowing through said telephone line to a predetermined value at a given telephone line loop resistance, said amplifier comprising:

at least one output transistor having first and second main electrodes coupled across said telephone line, and having a control electrode;

means for applying said telephone signals to said control electrode;

means coupled between said control electrode and one of said main electrodes for deriving a first signal related to the DC current flowing through said main electrodes;

means coupled across said telephone line for deriving a second signal related to the DC voltage appearing across said telephone line;

means for comparing said first and second signals to provide a third signal indicative of the difference between said first and second signals; and means coupled between said control electrode and the comparing means, and responsive to said third signal for adjusting the value of said DC current flowing through said main electrodes to said predetermined value.

6. The amplifier according to claim 5, wherein said main electrodes comprise a collector and an emitter electrode, wherein said control electrode comprises a base electrode and wherein said means for deriving said first signal is coupled between said base and emitter electrodes.

7. The amplifier according to claim 6, wherein said first signal is proportional to the DC current flowing through said telephone line.

8. The amplifier according to claim 7, wherein said first signal is the base-emitter DC voltage of said transistor.

9. The amplifier according to claim 5, wherein a plurality of transistors, having their respective electrodes parallel connected, are provided.

10. The amplifier according to claim 9, wherein said transistors have substantially matched DC operating characteristics.

11. The amplifier according to claim 5, wherein said means for comparing said first and second signals comprises a balanced differential input amplifier including a first, second and third transistors, said first transistor providing an active constant current source for said second and third transistors, said second and third transistors having input electrodes respectively coupled to one of said first and second signals, and one of said first and second transistors having its output electrode coupled to said control electrode of said output transistor.

12. The amplifier according to claim 5, wherein said means for applying said telephone signals incorporates said means for comparing said first and second signals.

13. An amplifier adapted for coupling telephone signals to a telephone line while controlling the DC line current flowing through said telephone line to a predetermined value at a given telephone line loop resistance, said amplifier comprising:

at least one output transistor having first and second main electrodes coupled across said telephone line, and having a control electrode;

means for applying said telephone signals to said control electrode;

first means coupled between said control electrode and one of said main electrodes for deriving a first signal related to the DC line current flowing through said main electrodes;

second means for providing a reference signal related to said given telephone line loop resistance; and means coupled to said first and second means and to said control electrode, and responsive to said first signal and said reference signal for adjusting said DC line current to said predetermined value.

14. The amplifier according to claim 13, wherein said first signal is derived from the base-emitter voltage of said output transistor.

15. The amplifier according to claim 14, wherein said reference signal is provided by a voltage divider coupled across said telephone line.

16. The amplifier according to claim 13, wherein said output transistor is modulated by said telephone signals over a range of conductivity values including its cut-off and saturated values.

17. The amplifier according to claim 13, wherein said output transistor includes a feedback loop between one of said main electrodes and said control electrode, said feedback loop including means responsive to said telephone signals for translating the AC output impedance of said amplifier between two levels wherein said output impedance is decreased when said amplifier is applying said telephone signals to said telephone line.

* * * * *